Nov. 19, 1957 L. T. RICE, JR 2,813,747
EXPANSIBLE HOUSE TRAILER
Filed March 16, 1956 5 Sheets-Sheet 4
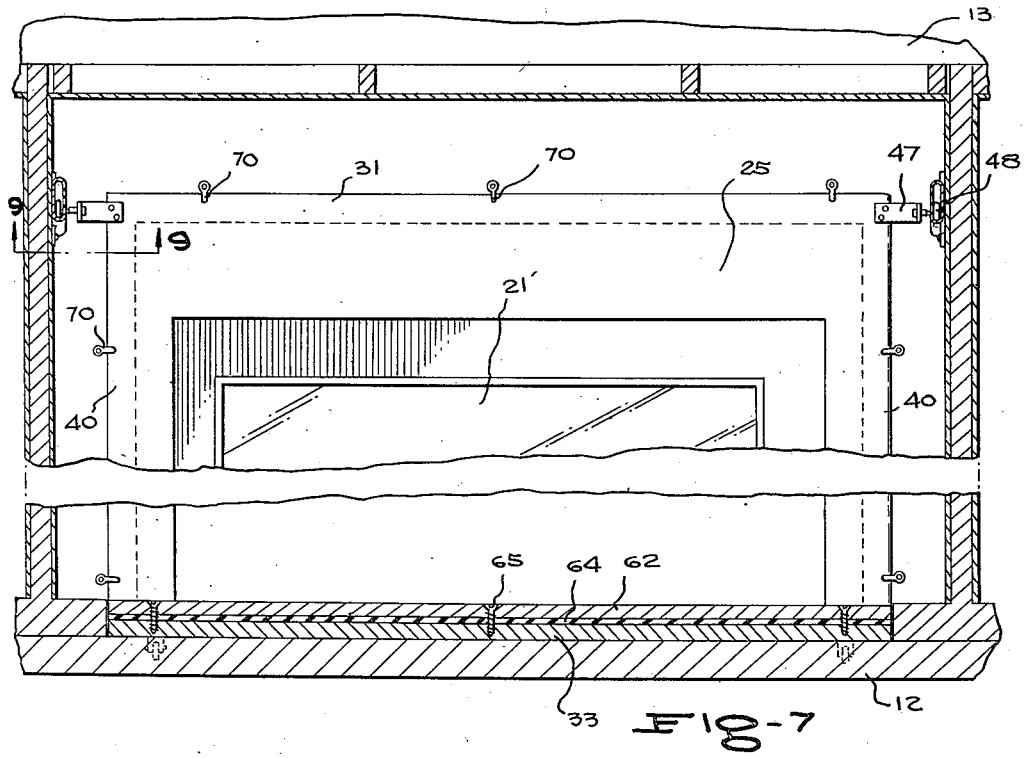
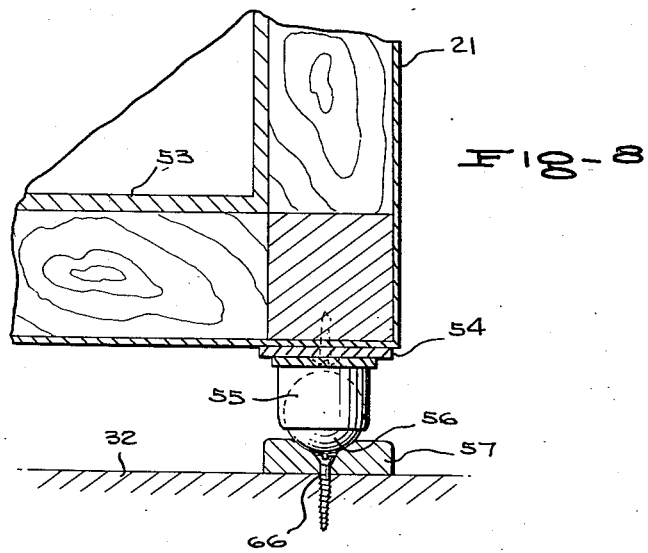
INVENTOR.
LESTER T. RICE JR.
BY
McMorrow, Berman + Davidson
ATTORNEYS

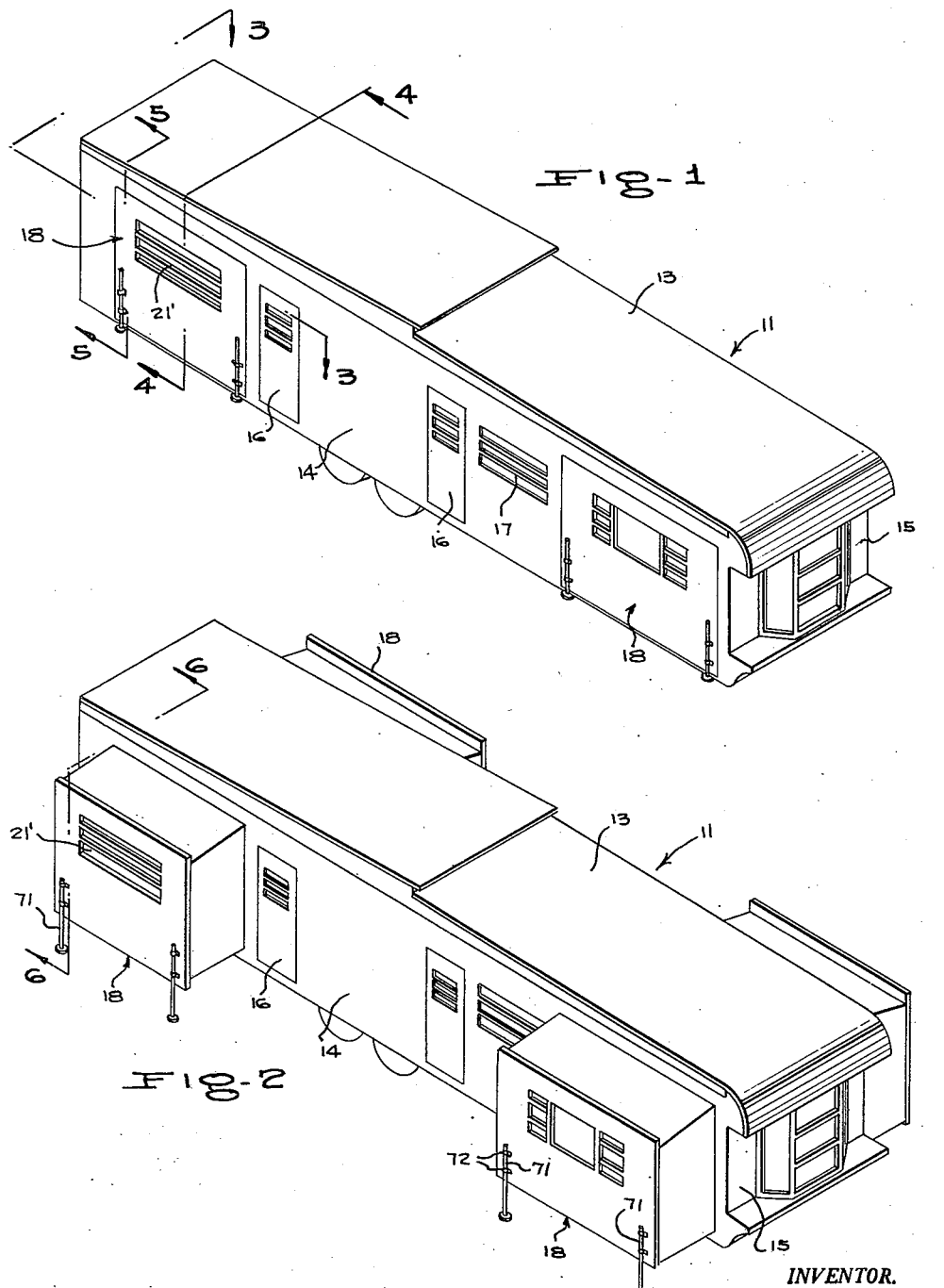

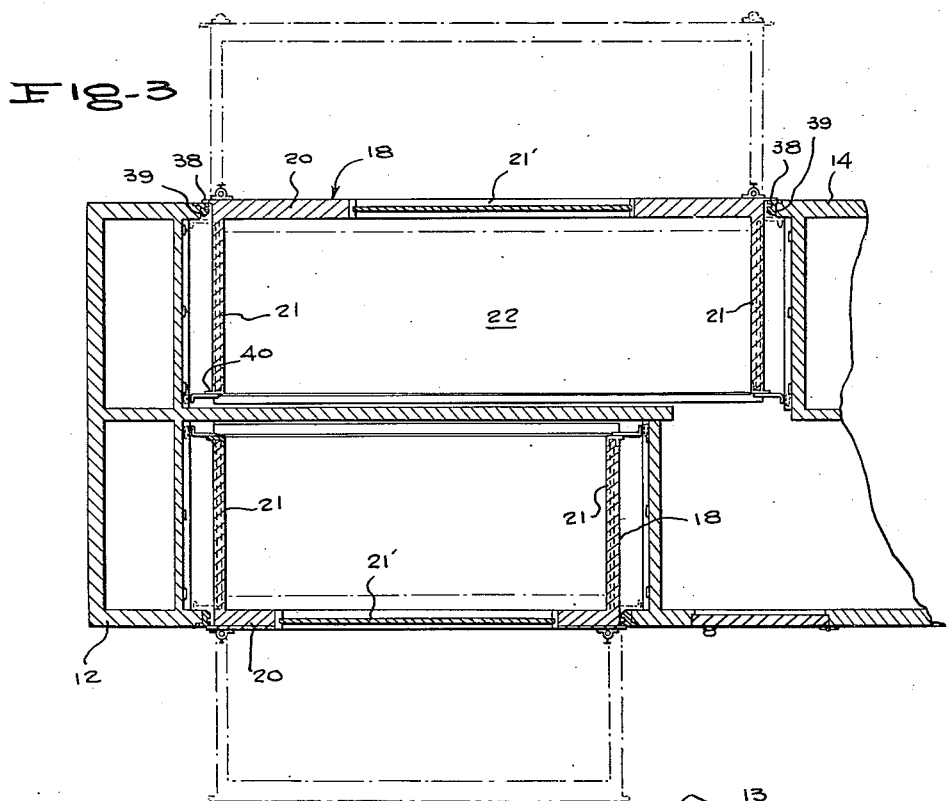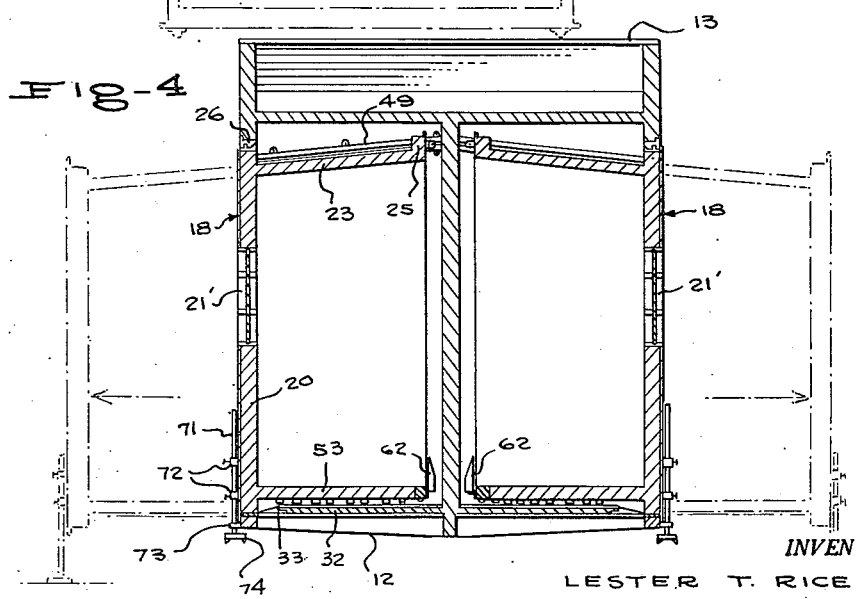

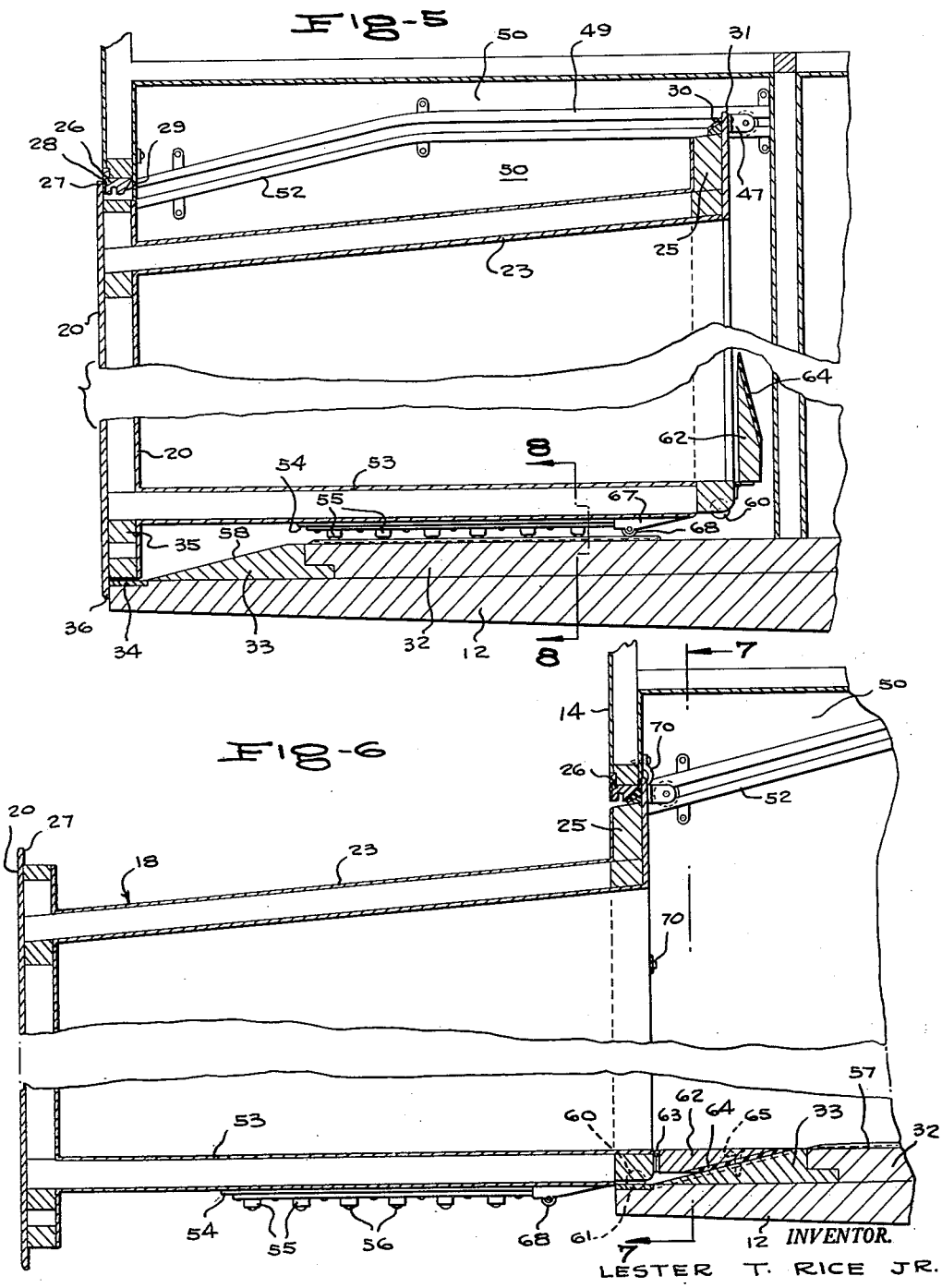

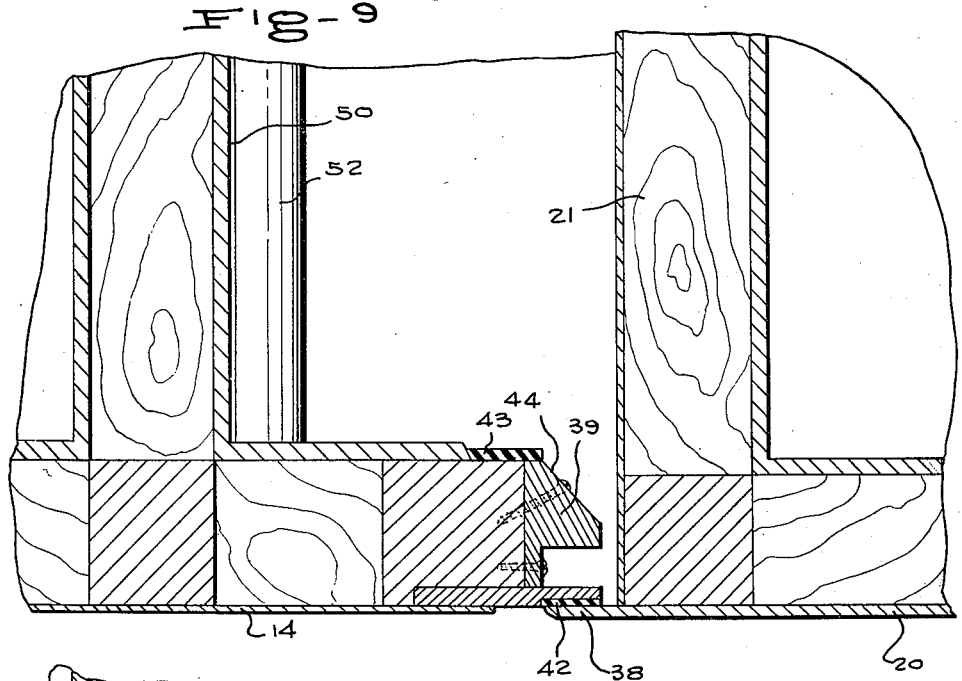
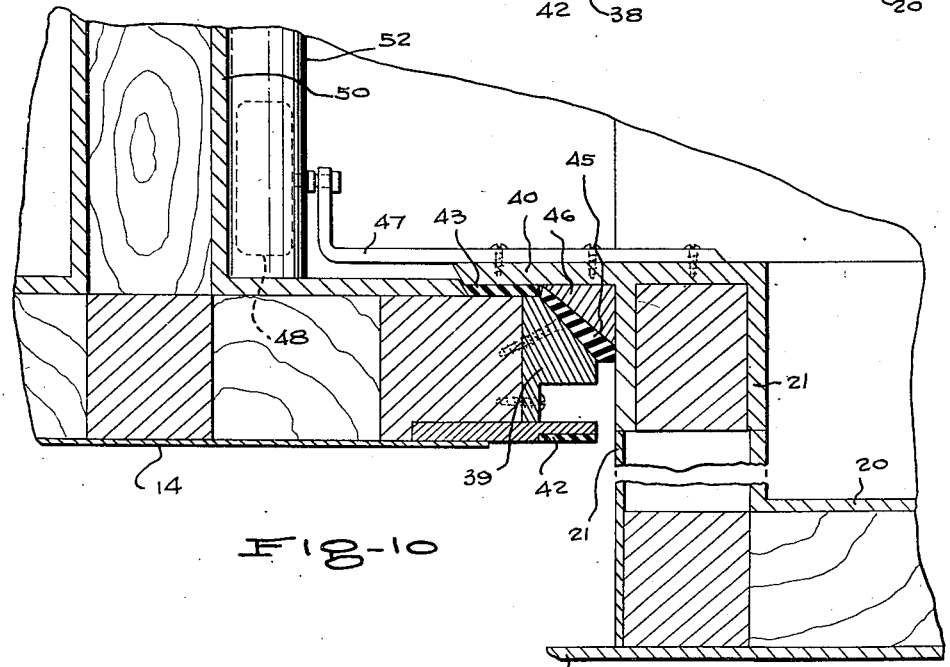

United States Patent Office 2,813,747
Patented Nov. 19, 1957

2,813,747

EXPANSIBLE HOUSE TRAILER

Lester T. Rice, Jr., Waterloo, N. Y.

Application March 16, 1956, Serial No. 572,150

2 Claims. (Cl. 296—23)

This invention relates to house trailers, and more particularly to a house trailer provided with extensible portions providing increased living space in the trailer.

A main object of the invention is to provide a novel and improved house trailer of the type having laterally extensible portions to increase the interior space in the trailer, the improved trailer being simple in construction, being easy to expand or contract, and providing a means of greatly enlarging the interior space of the trailer without interfering with the mobility thereof.

A further object of the invention is to provide an improved expansible house trailer which is inexpensive to fabricate, which is durable in construction, which is attractive in appearance, and which requires relatively small effort and time to expand when it is being set up for use as a stationary home and which involves only a small amount of time and labor to contract in preparing the trailer for transportation.

Further objects and advantages of the invention will become apparent from the following description and claims, and from the accompanying drawings, wherein:

Figure 1 is a perspective view of an improved house trailer constructed in accordance with the present invention, shown in condition for transportation.

Figure 2 is a perspective view of the house trailer of Figure 1, shown set up for use as stationary living quarters.

Figure 3 is an enlarged fragmentary horizontal cross sectional view taken on the line 3—3 of Figure 1.

Figure 4 is an enlarged transverse vertical cross sectional view taken on the line 4—4 of Figure 1.

Figure 5 is a fragmentary enlarged transverse vertical cross sectional view taken on the line 5—5 of Figure 1.

Figure 6 is a fragmentary cross sectional view, similar to Figure 5, but showing the housing section thereof in fully extended position.

Figure 7 is a vertical cross sectional view taken on the line 7—7 of Figure 6.

Figure 8 is an enlarged vertical cross sectional detail view taken on the line 8—8 of Figure 5.

Figure 9 is an enlarged horizontal cross sectional detail view taken on the line 9—9 of Figure 7, showing the parts as arranged when the housing section is in its retracted position.

Figure 10 is a horizontal cross sectional view, similar to Figure 9, but showing the arrangement of the parts when the housing section is in its fully extended position.

Referring to the drawings, 11 generally designates an improved house trailer constructed according to the present invention, the house trailer 11 comprising a conventional wheeled chassis including a bottom frame structure 12 on which is mounted a house-like main structure 13. The house-like main structure 13 includes side walls 14 and end walls 15, said side walls being provided with suitable doors 16 and windows 17. The end portions of the house-like main structure 13 are provided with respective laterally extensible housing sections 18 which are extensible through the opposite side walls 14 to provide increased inside space in the end portions of the structure, as will presently be described. For example, the end portions of the house-like main structure 13 may be utilized as bedrooms, whereas the intermediate space of the structure may be utilized as living room and kitchen space.

It will be understood further that the extensible housing sections 18, 18 at the opposite ends of the house-like main structure 13 are identical in construction, and therefore the further description will concern itself with the extensible sections at one end of the main structure 13.

Each laterally extensible housing section 18 comprises a main exterior wall portion 20, which may be provided with a suitable window 21', transverse vertical side walls 21, 21, floor section 22, and a downwardly and outwardly inclined roof section 23. As shown in Figure 4, the outer wall section 20 rises to substantially the same height as the inner marginal flange 25 of the room section 23, the edge of the aperture in the side wall 14 of the main housing structure being provided with suitable sealing gasket means 26 which is sealingly engaged by the top edge of the main outer wall 20 of the extensible section when the extensible section is in its retracted position, shown in Figure 4, and which is also sealingly engaged by the rear flange 25 of the room 23 of the extensible section when said extensible section is in its fully extended position, shown in Figure 2 and also shown in dotted view in Figure 4. As is more distinctly illustrated in Figures 5 and 6, the wall 20 is provided at its top edge with the lip portion 27 which is sealingly engageable with a deformable resilient strip 28 secured to the member 26 when the housing section is in its retracted position. The member 26 is formed on its inside face with a downwardly and outwardly inclined surface 29 which is sealingly engageable by a similarly inclined resilient deformable sealing strip 30 mounted on the top edge of the flange 25 and secured against an upstanding lip portion 31 provided on the inner surface of said flange 25, the resilient deformable strip 30 being sealingly engageable with the inclined surface 29 when the housing section is in its fully extended position, as shown in Figure 6.

Designated at 32 is the floor of the main house-like trailer structure, said floor being secured on the chassis frame 12, as shown in Figure 6. At its side margins the floor 32 comprises the wedge-like strips 33 which have top surfaces inclined downwardly and outwardly, as shown in Figures 5 and 6, said wedge-like surfaces extending substantially adjacent to the horizontal longitudinal bearing strips 34 secured to the frame 12 at the outer margins thereof subjacent the laterally extensible housing sections, and being arranged to support the depending bottom edge portions 35 of the outside walls 20 of said extensible housing sections when said housing sections are in their retracted positions, as shown in Figure 5. As is clearly illustrated in Figure 5, the outside panel of the wall 20 comprises a depending lip element 36 which abuts against the side edge of chassis frame 12 to limit the inward movement of the housing sections, in cooperation with the top lip element 27 which abuts against the sealing strip 28, as above described.

As shown in Figure 3, the wall 20 is also provided at its vertical edges with outwardly extending lip elements 38, 38 which sealingly engage against vertical side sealing strips 39, 39 provided at the side edges of the aperture in wall 14 to provide a sealed joint thereat when the extensible housing section is in its retracted position. The vertical walls 21 are provided on their inside ends with sealing flange elements 40 engageable with the inside surfaces of the vertical strips 39 when the housing section is in its extended position to provide a sealed joint thereat.

Thus, as shown in Figures 9 and 10, the vertical strips 39 may be provided at their outside portions with resilient deformable sealing strips 42 sealingly engageable by the lip elements 38 when the housing sections are in their retracted positions, for example, as shown in Figure 9. Secured to the vertical margins of the aperture in the wall 14 at its inside surface adjacent the strips 39 are respective resilient deformable sealing strips 43 which are sealingly engaged by the flange elements 40 when the housing sections are in fully extended positions. As shown in Figures 9 and 10, the strips 39 are formed with the inwardly facing inclined sealing surfaces 44 which are sealing engageable by resilient deformable strips 45 secured to the wedge-like strip elements 46 carried by the extensible housing section at the corners defined between the flanges 40 and the side walls 21, as is clearly shown in Figure 10.

Secured to the end portions of the upstanding lip portions 31 are respective angled brackets 47 on which are journaled respective rollers 48 which are supportingly engaged in respective channeled tracks 49 secured to the main structure of the trailer at opposite sides of the extensible housing sections. Thus, the main structure may comprise vertical depending wall portions 50 at opposite sides of the extensible sections 18, the wall portions 50 being transverse, as shown in Figures 5 and 6 and being spaced to provide sufficient clearance for the extensible housing sections. Each track 49 comprises a horizontal main portion and a downwardly and outwardly inclined outer portion 52 extending substantially parallel to the top surface of the subjacent portion of the marginal flooring strip 33, as shown in Figure 5.

Secured beneath the side marginal portions of the floor 22 of each housing section are the respective plate-like brackets 54 to which are secured the depending, spaced ball sockets 55, said ball sockets having rotatably mounted therein the respective depending balls 56. The ball rollers 56 engage channeled trough members 57 secured to the floor 32 of the main structure which are of sufficient length to support the housing sections for horizontal movement toward and away from their retracted positions, as shown in Figure 5. As will be readily apparent from Figure 5, when the housing sections are extended, namely are moved laterally to the left, as viewed in Figure 5, the rollers 56 move through the channeled guides 57, and finally engage the inclined top surface, shown at 58 of the wedge-like side strip 33, allowing the section to be extended until the rollers 56 clear the surface 58 and the strip 34. The housing section at the same time is supported on the upper tracks 49 by the rollers 48 and is guided on the inclined portions 52 of tracks 49 as it is extended to its ultimate position. In this ultimate position, inner roller elements 60 provided beneath the inner corners of the housing section, namely, in the plane of the flange 25, engage in suitable recesses provided therefor in the strip 34, shown at 61 in Figure 6.

Designated at 62 is a substantially wedge-shaped filler block which is hinged at 63 to the inner edge of the floor 53 of the housing section, said filler block 62 being swingable into engagement with the inclined surface 58 of the side marginal strip 33, as shown in Figure 6, and being provided with a resilient deformable gasket element 64 at its inclined surface adapted to sealingly engage the inclined surface 58 of strip 33. Thus, when the housing section 18 is in its fully extended position, the wedge-like member 62 may be secured to the strip 33 by suitable fasteners, such as screws 65. When secured to strip 33 in the manner illustrated in Figure 6, the filler block 62 provides a flush surface between the floor 53 of the housing section and the floor 32 of the main trailer structure.

When the housing sections are in their extended positions, as in Figure 2, the channeled strips 57 may be detached, if so desired, said strips being secured to the floor 32 by readily removable screws 66, as shown in Figure 8.

When the housing sections are in their retracted positions, as shown in Figure 5, the wedge-like filler blocks 62 may be rotated to their vertical positions, as shown, whereby they do not interfere with the retraction of the housing sections.

The floor 53 of each housing section is provided at its rear portion with respective brackets 67 carrying depending rollers 68 engageable on the channeled guides 57 and serving as preliminary elevating means for the housing sections when the sections are moved toward their retracted positions, the rollers 68 first engaging the supporting strip 61, then ascending the inclined surface 58, and then engaging on the channeled guides 57 as the housing section is moved inwardly toward its retracted position. As will be readily apparent, the corner rollers 60 are active only on the inclined surfaces 58, being lifted away from the guide tracks 57 as soon as the rollers 68 engage the inclined surface 58 of strip 33. However, the rollers 60 cooperate with the recesses 61 to limit the outward extension of the lower portion of the extensible housing section when said section is extended to its ultimate position, shown in Figure 6.

As shown in Figures 6 and 7, pivoted latch elements 70 are provided on the inside margin of the aperture in the side wall 14 through which each housing section is extensible, the pivoted catch elements 70 being lockingly engageable with the flange portion 31 at the top of the housing section and with the side flange portions 40 at the vertical sides of the housing section to lock said housing section in its laterally extended position. Thus, when the section 18 is extended to its ultimate position, the pivoted latch element 70 may be rotated to positions transversely overlying the respective flanges 31 and 40, as shown in Figure 7, to lock the housing section in its laterally extended position.

Each housing section is provided at its outer corner portions with respective vertically adjustable supporting standards 71, 71, said supporting standards being slidably engaged in suitable guide brackets 72 secured on the respective lower side marginal portions of the outer wall 20 of each housing section, suitable locking means, such as set screws, being provided in the brackets 72, to secure the standards 71 in desired adjusted positions in the bracket 72. The outer edges of the frame 12 are provided with suitable fastening collar elements 73 which are located so as to be in vertical alignment with the brackets 72, 72 when the housing sections are in their retracted positions, whereby the standards 71 may be received in the collar elements 73 and be secured therein, for example, as shown in Figure 4, wherein the standards 71 are secured in elevated positions. The elements 73 may comprise conventional clamping collars, spring clips, or other suitable conventional means to engage a rod-like member, similar to the rod-like element employed for each standard 71. Each standard 71 is provided at its bottom end with a ground-engaging shoe portion 74, serving as a supporting pad for the standard when it is in its lowered position, shown in dotted view in Figure 4. As will be readily understood, when the housing section is extended to its ultimate position, the associated standards 71 are released and lowered to ground-engaging positions, after which the standards are locked in their brackets 72, whereby said standards support the outer portions of the housing sections. Conversely, when the housing sections are retracted, the standards 71 are first elevated, and are subsequently engaged with the collar elements 73 as the housing sections are moved to their retracted positions.

As previously mentioned, the collar elements 73 may comprise simple U-shaped spring clips grippingly engageable with the lower portions of the standards 71, or alternatively, may comprise clamping collars having detachable segments which may be temporarily removed to allow the standards 71 to be engaged therewith, and which may be later replaced over the standards and clampingly secured so as to grip the standards and cooperate with the bracket elements 72 in fastening the standards in elevated positions, as shown in Figure 4.

Any suitable means may be employed to secure the housing sections in their retracted positions, shown in Figure 3. If so desired, the securing means for the housing sections may comprise the standards 71, assuming that the bracket elements 73 are of a sufficiently sturdy nature to secure the standards 71 against outward movement with respect to the frame 12 of the trailer.

While a specific embodiment of an improved expansible house trailer has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. In a vehicle body having a wheeled chassis and a house-like main structure mounted on said chassis, a laterally extensible housing section mounted in said structure for lateral movement through a side wall of the structure, roller means secured to side marginal portions of said housing section, laterally extending guide track means mounted in said structure and being supportingly engageable with said roller means, means on the housing section engageable with said side wall to limit lateral extension of the housing section, depending support means connected to the outer wall portion of the housing section and being engageable with the ground to support the housing section when in its outwardly extended position, said guide track means and the floor surface of the house-like structure being inclined downwardly and laterally at the side portions of the main structure, whereby the housing section descends as it is moved to its outward limiting position, and a substantially wedge-shaped filler block hinged to the inner edge of the floor of the housing section and being movable into mating engagement with the inclined floor surface of the structure to present a substantially flush surface between the floor of the housing section and that of the house-like main structure.

2. In a vehicle body having a wheeled chassis and a house-like main structure mounted on said chassis, a laterally extensible housing section mounted in said structure for lateral movement through a side wall of the structure, respective roller brackets secured to the respective upper side portions of the housing section, rollers journaled in said brackets, respective laterally extending guide tracks mounted in the upper portion of said structure and supportingly interengaging with said rollers, depending rollers journaled to the bottom of said housing section at the opposite sides thereof, laterally extending track means in the floor of the housing structure supportingly engageable with said last-named rollers, means on the housing section engageable with said side wall to limit lateral extension of the housing section, depending vertical supporting standards slidably mounted on the outer wall portion of the housing section and being engageable with the ground to support the housing section when in its outwardly extending position, said guide tracks and said last-named laterally extending track means and the floor surface of the house-like structure being inclined downwardly and laterally at the side portions of the main structure, whereby the housing section descends as it is moved to its outward limiting position, and a substantially wedge-shaped filler block hinged to the inner edge of the floor of the housing section and being movable into mating engagement with the inclined floor surface of the main structure to present a substantially flush surface between the floor of the housing section and that of the house-like main structure.

References Cited in the file of this patent

UNITED STATES PATENTS

| | | |
|---|---|---|
| 1,436,984 | Follett | Nov. 28, 1922 |
| 2,225,319 | Rollo | Dec. 17, 1940 |
| 2,704,223 | Houdart | Mar. 15, 1955 |
| 2,744,781 | Black | May 8, 1956 |